(12) United States Patent
Doerr et al.

(10) Patent No.: US 9,100,280 B2
(45) Date of Patent: Aug. 4, 2015

(54) UNDIRECTED CROSS CONNECTS BASED ON WAVELENGTH-SELECTIVE SWITCHES

(75) Inventors: Christopher R. Doerr, Middletown, NY (US); Gordon T. Wilfong, Bedminster, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 318 days.

(21) Appl. No.: 12/857,208

(22) Filed: Aug. 16, 2010

(65) Prior Publication Data

US 2010/0303461 A1    Dec. 2, 2010

Related U.S. Application Data

(62) Division of application No. 11/735,112, filed on Apr. 13, 2007, now Pat. No. 7,801,156.

(51) Int. Cl.
*H04L 12/28* (2006.01)
*H04L 12/751* (2013.01)
*H04L 12/721* (2013.01)

(52) U.S. Cl.
CPC ............... *H04L 45/02* (2013.01); *H04L 45/62* (2013.01)

(58) Field of Classification Search
CPC ........................... H04B 10/2503; H04B 10/27
USPC ................ 370/254–257, 360–367, 370, 372, 370/386–388, 400, 407–408
See application file for complete search history.

(56) References Cited

U.S. PATENT DOCUMENTS

| | | | | |
|---|---|---|---|---|
| 4,833,468 A * | 5/1989 | Larson et al. | ................. | 340/2.22 |
| 5,436,886 A * | 7/1995 | McGill | ........................ | 370/219 |
| 5,451,936 A * | 9/1995 | Yang et al. | ..................... | 340/2.22 |
| 5,878,177 A * | 3/1999 | Karasan et al. | .................. | 385/17 |
| 6,532,090 B1 * | 3/2003 | Doerr et al. | ...................... | 398/82 |
| 6,859,576 B2 * | 2/2005 | Kim et al. | ........................ | 385/17 |
| 6,868,084 B2 * | 3/2005 | Konda | ........................ | 370/395.1 |
| 7,720,330 B2 * | 5/2010 | Bortolini et al. | ................. | 385/24 |
| 2003/0161338 A1 | 8/2003 | Ng et al. | ........................ | 370/437 |
| 2004/0220886 A1 | 11/2004 | Kumaran et al. | ............. | 705/400 |
| 2005/0259571 A1 * | 11/2005 | Battou | ......................... | 370/217 |
| 2005/0271060 A1 | 12/2005 | Kodialam et al. | ............. | 370/394 |
| 2006/0188260 A1 | 8/2006 | Nikolopoulos et al. | ........ | 398/83 |
| 2006/0221948 A1 * | 10/2006 | Benner et al. | .................. | 370/389 |
| 2008/0075071 A1 * | 3/2008 | Beshai | .......................... | 370/386 |
| 2009/0041457 A1 * | 2/2009 | Maki et al. | ...................... | 398/45 |

OTHER PUBLICATIONS

Doerr et al., "Reducing the Complexity of Mesh Nodes by Using Reflective Wavelength-Selective Switches", IEEE Journals of Selected Topics in Quantum Electronics, vol. 12. No. 4 Jul./Aug. 2006.

Simmons et al., "Optical Crossconnects of Reduced Complexity for WDM Networks with Bidirectional Symmetry", IEE Photonics Technology Letters, vol. 10, No. 6, Jun. 1998.

\* cited by examiner

*Primary Examiner* — Thai Hoang
(74) *Attorney, Agent, or Firm* — Ryan, Mason & Lewis, LLP

(57) ABSTRACT

Undirected cross connects are provided based on wavelength-selective switches. An undirected Cantor network is disclosed where the switch nodes are wavelength selective switches. An undirected Clos cross connect is also disclosed where one or more undirected switches are undirected Cantor networks having at least one wavelength selective switch.

11 Claims, 10 Drawing Sheets

UNDIRECTED CROSS CONNECTS BASED ON WAVELENGTH-SELECTIVE SWITCHES

CROSS REFERENCE TO RELATED APPLICATIONS

This application is a divisional of U.S. patent application Ser. No. 11/735,112, (now U.S. Pat. No. 7,801,156), filed Apr. 13, 2007, incorporated by reference herein.

FIELD OF THE INVENTION

The present invention relates to wavelength-selective switches, and more particularly, to undirected cross connects employing such wavelength-selective switches.

BACKGROUND OF THE INVENTION

The nonblocking of cross connect switches in a communications network assesses the ability to route connections from input ports to output ports. A cross connect C can be thought of as a directed graph where input ports are nodes with no incoming edges and output ports are nodes with no outgoing edges. A request for a connection from an input port a to an output port b will be a request for a directed path from a to b. For a more detailed discussion of nonblocking cross connects, see, for example, J. Y. Hui., Switching and Traffic Theory for Integrated Broadband Networks, Kluwer Academic Publishers, Norwell, Mass. (1990) and G. M. Masson et al., "A Sampler of Circuit Switching Networks," IEEE Computer, 5:32-48 (June 1979).

For many networks, however, such as long-haul optical networks, connection requests have "bidirectional symmetry." In other words, there is a request to connect i to j if and only if there is also a request to connect j to i and moreover these two connections should be routed on the same bidirectional links. See, J. Simmons et al., "Optical Crossconnects of Reduced Complexity for WDM Networks with Bidirectional Symmetry, IEEE Photonics Technology Letters, 10(6):819-821 (June 1998). This is due to the fact that optical network management is typically designed to connect transceivers in pairs. A restriction to bidirectional demands may allow for simplified cross connect designs. For bidirectional demands, a cross connect will not have input and output ports, instead it will just have ports.

The cross connect will be an undirected network where the ports are leaf nodes and a request for a connection will be a request for an undirected path between two ports. This is of interest when one has symmetric demands (i.e., there is a demand d from node i to node j if and only if there is a demand d' from node j to node i) and moreover demands d and d' should be routed along the same undirected path.

A cross connect is said to be strictly nonblocking if all connections from input ports to output ports can be routed without disturbing other connections. A cross connect is said to be widesense nonblocking if there exists a routing algorithm such that if all previous connections have been routed using that algorithm, then that algorithm will find a route for any subsequent connection requests.

A need exists for a modification to traditional cross connect designs for this undirected case. A further need exists for improved cross connect designs for the undirected case that exhibit good nonblocking properties. Yet another need exists for improved cross connect designs based on various four-port switches.

SUMMARY OF THE INVENTION

Generally, undirected cross connects are provided based on wavelength-selective switches. According to one aspect of the invention, an undirected Cantor network is disclosed that comprises k ports; at least one layer of switch nodes, wherein the switch nodes are wavelength selective switches; and k switches for connecting the k ports to the at least one layer of switch nodes. The k switches can be, for example, 1×3 switches. In one exemplary embodiment, the disclosed undirected Cantor network comprises half of a directed version of a Cantor network. The disclosed undirected Cantor network can be simplified by replacing one or more nodes in a middle layer by one or more connections and then merging as pairs one or more nodes in a final layer that are connected by two parallel links.

According to another aspect of the invention, an undirected Clos cross connect is disclosed that comprises k ports; n first stage p×m switches connected to the k ports; and a plurality of second stage undirected switches, wherein one or more of the undirected switches are undirected Cantor networks having at least one switch node that is a wavelength selective switch. The first stage switches can be hybrid cross connects.

A more complete understanding of the present invention, as well as further features and advantages of the present invention, will be obtained by reference to the following detailed description and drawings.

DETAILED DESCRIPTION

Figure 1:
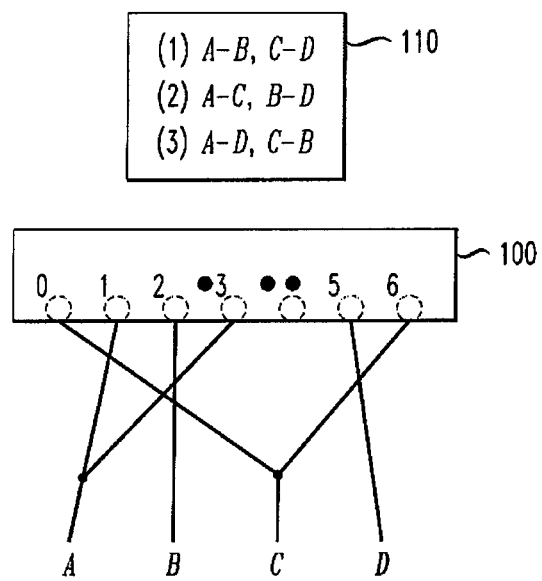
FIGS. 1 and 2 illustrate exemplary reflective wavelength selective switches that can be used in accordance with the present invention to construct an undirected cross connect.

The present invention provides undirected (or bidirectional) widesense nonblocking cross connects based on four-port switches.

Directed Cross Connect Definitions

A k×k directed cross connect is a directed graph C with k source nodes (i.e., nodes with no incoming edges) called input nodes and k sink nodes (i.e., nodes with no outgoing edges) called output nodes. A directed demand is a request for a directed path in C from an input node to some output node. The notation d=(i, j) denotes the directed demand d with input node i and output node j. A set S of directed demands is valid if all directed demands in S have distinct input nodes and distinct output nodes. A routing $R_d$ of a directed demand d is a directed path in C from the input node to the output node of d. A valid routing of a valid set of directed demands S is a set of routings $R=\{R_d : d \in S\}$ so that if d, d'∈S, then $R_d$ and $R_{d'}$ are arc disjoint.

Undirected (or Bidirectional) Cross Connects Definitions

A size k (undirected) cross connect C is an undirected graph with k leaf nodes called ports. A demand is a request for a path in C between a pair of ports. The notation d={i,j} denotes the demand d that requires a path between ports i and j. A set S of demands is valid if no two demands in S have a port in common. A routing $R_d$ of a demand d is a path in C between the ports of d. A valid routing of a valid set of demands S is a set of routings R={$R_d$:d∈S} so that if d,d'∈S, then $R_d$ and $R_{d'}$ are edge disjoint.

Hybrid Cross Connects

A hybrid cross connect is an undirected (bidirectional) network that has two sets of ports A and B. A hybrid demand is a request for a path between a pair of ports in A or a request for a path between a port in A and a port in B.

GENERAL DEFINITIONS

All definitions in this section are given for undirected cross connects but remain the same for directed (or hybrid) cross connects if the term "demand" is replaced by "directed demand" (or "hybrid demand").

There are traditionally three levels of nonblocking. From strongest to weakest, they are:

1. Strictly Nonblocking—A cross connect is strictly nonblocking if for all valid demand sets S, all valid routings R of S, and any demand d∉S such that S'=S∪{d} is a valid demand set, there is a valid routing R' of S' such that R ⊂ R'.

2. Widesense Nonblocking—A cross connect is widesense nonblocking if there is a routing algorithm, Alg, such that for all valid demand sets S, all valid routings R of S that have been computed using algorithm Alg, and any demand d∉S such that S'=S∪{d} is a valid demand set, algorithm Alg will find a valid routing R' of S' such that R ⊂ R'.

3. Rearrangeably Nonblocking—A cross connect is rearrangeably nonblocking if for any valid set of demands S there is a valid routing R of S.

Wavelength Selective Switches

Although the present invention is illustrated herein in the context of optical networks and in particular, wavelength division multiplexing (WDM) networks, the disclosed cross connects are not specific to any particular kind of network e.g., optical, electronic or wireless mesh networks, as would be apparent to a person of ordinary skill in the art.

The cross connects will be wavelength selective cross connects. In other words, each demand will be a request to route a particular wavelength between two given ports.

U.S. patent application Ser. No. 11/434,938, entitled, "Multiple Port Symmetric Reflective Wavelength-Selective Mesh Node," filed May 16, 2006, and incorporated by reference herein, discloses reflective wavelength selective switches (WSS) used as building blocks for the undirected cross connects disclosed herein. See also, U.S. patent application Ser. No. 11/434,919, entitled, "Multiple Port Symmetric Transmissive Wavelength-Selective Mesh Node," filed May 16, 2006, incorporated by reference herein.

Generally, the disclosed reflective wavelength selective switches multiplex and demultiplex the wavelengths at each port and there is a steering mirror for each available wavelength. The switches are designed so that they are nonblocking, i.e., a connection made by the switch does not have to be interrupted when it is subsequently required to form an additional connection.

Figure 2:
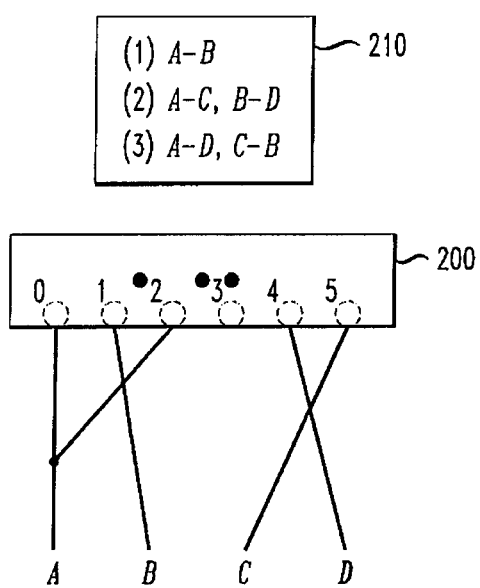

FIGS. 1 and 2 illustrate reflective wavelength selective switches 100, 200 that can be used in accordance with the present invention to construct an undirected cross connect. In FIGS. 1 and 2, the switches 100, 200 have an open circle to indicate each port and have solid dots to indicate mirror states independently chosen for each wavelength.

Degree-4 Node

The exemplary 1×6 WSS switch 100 shown in FIG. 1 is an undirected cross connect with four ports for providing one channel of a multiple wavelength channel signal with reciprocal connectivity between node ports A, B, C, and D. For a four port mesh node, a total of 4!/[2!(4-2)!] or 6 unique node port pair connections must be made by the 1×6 WSS apparatus. Note that only terminal 4 (of the seven terminals labeled left to right as 0-6) of the 1×6 WSS switch 100 is unconnected. Two of the terminals (2 and 5) are directly connected to node ports B and D, respectively. The node port A connects via a 1×2 directional coupler (not shown) to terminals 1 and 3 of the 1×6 WSS apparatus 100. The node port C connects via a 1×2 directional coupler (not shown) to terminals 0 and 6. The steerable mirror of the 1×6 WSS is switched to one of three positions (or states), as denoted by the left, center, and right connection dots "•". The 1×6 WSS 100 is switchably controlled by a control signal (not shown) to enable reciprocal connections to be established between six unique pairs of node ports (i.e., AB, AC, AD, BC, BD, BC) by switching the mirror to one of the three positions. Thus, as shown in table 110, in a first switching state (1) (associated with left connection dot), two simultaneous connections are made between ports A-B and C-D (since two sets of terminals 2 and 3 as well as 0 and 5 are symmetrically located around the left connection dot). In the second switching state (2) (associated with the center connection dot), a connection is made between ports A-C and B-D (since the terminals 1 and 6 as well as 2 and 5 are symmetrically located around the center connection dot). In the third switching state (3) (associated with the right connection dot), a connection is made between ports A-D and C-B (since the terminals 3 and 5 as well as 2 and 6 are symmetrically located around the right connection dot). In this manner, a reciprocal connection is established between each unique pair of node ports by switching the mirror of the 1×6 WSS to one of the three positions. While the degree-4 mesh node has been shown to include a 1×6 WSS, it should be noted that any 1×K switch can be used, where K is greater than or equal to 6, with the additional terminals left unconnected.

Partitioned Degree-4 Node

The exemplary 1×6 WSS switch 200 shown in FIG. 2 is an undirected cross connect with four ports for providing one channel of a multiple wavelength channel signal with reciprocal connectivity between node ports A, B, C, and D. FIG. 2 illustrates a hybrid design, referred to as a hybrid-4 node with six terminals. As shown in table 210, the switch 200 can connect port A with port B or alternatively can connect port A with port C and port B with port D or port A with port D and port B with port C.

Note that only terminal 3 (of the six terminals labeled left to right as 0-5) of the 1×5 WSS switch 200 is unconnected. Three of the terminals (1, 4 and 5) are directly connected to node ports B, D and C, respectively. The node port A connects via a 1×2 directional coupler (not shown) to terminals 0 and 2 of the 1×5 WSS apparatus 200. The steerable mirror of the 1×5 WSS is switched to one of three positions (or states), as denoted by the left, center, and right connection dots "•".

Along these same lines, a 3-port switch can be constructed that allows only the connection A-B or the connection A-C, as would be apparent to a person of ordinary skill in the art. This will be called a 1×2 switch. In a straightforward manner, a 1×n switch can be constructed using n−1 such 1×2 switches. Also, one could implement a 1×n switch using a single n+1 port WSS in a bidirectional way, as would be apparent to a person of ordinary skill in the art.

The Cantor Network

The present invention recognizes that a traditional directed cross connect can be modified to provide an undirected cross connect.

Directed Cantor Network

One well-known strictly nonblocking directed cross connect design is the Cantor network. See, D. Cantor, "On Construction of Nonblocking Switching Networks," Proc. of Symp. on Computer-Communications Networks and Teletraffic, 253-255 (1972). The structure of a k×k Cantor network can be viewed as follows. In the middle of the network are $\log_2 k$ copies of k×k Beneš networks. See, V. E. Beneš, Mathematical Theory of Connecting Networks and Telephone Traffic. Academic Press, New York, N.Y. (1935). The $i^{th}$ input (output) node of the Cantor network is connected to the $i^{th}$ input (output) node of each of the $\log_2 k$ copies of the center Beneš networks.

Figure 3:
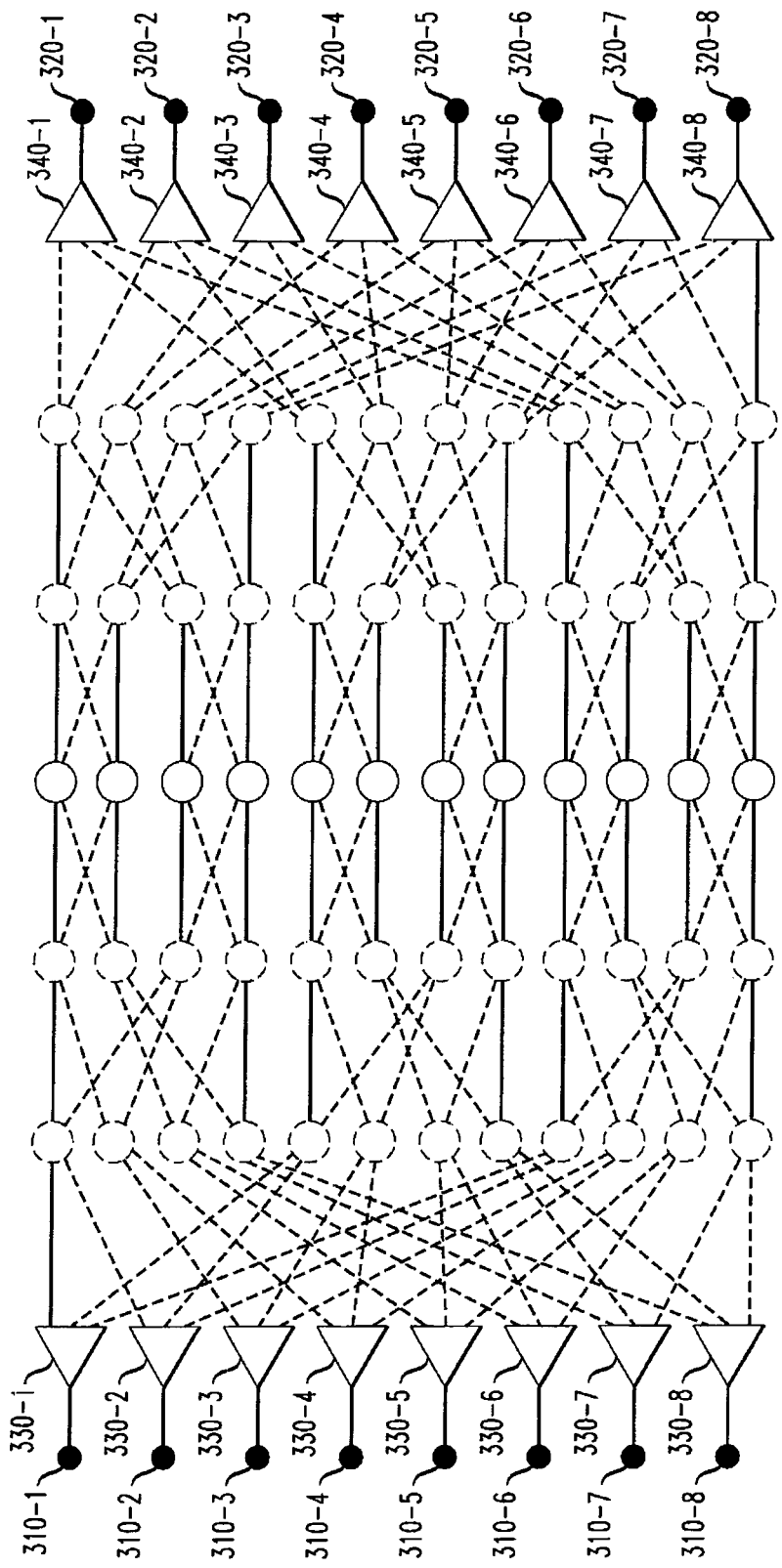
FIG. 3 illustrates an exemplary 8×8 Cantor network.

FIG. 3 illustrates an 8×8 Cantor network 300. As shown in FIG. 3, solid nodes on the left denote input nodes 310-1 through 310-8, solid nodes on the right denote output nodes 320-1 through 320-8 and solid nodes in between represent the input and output nodes of the constituent Beneš networks. The open circles are 2×2 switches, referred to as switch nodes. The triangles are 1×3 switches 330-1 through 330-8 and 340-1 through 340-8. All edges are directed from left to right.

Let C(k) be a k×k Cantor network made up of Beneš networks $B_1(k), B_2(k), \ldots, B_m(k)$, where $m=\log_2 k$. The switch nodes in all the $B_i(k)$'s can be thought of as being in layers (or columns in FIG. 3.) numbered from left to right starting at 0. Then, there are $2 \log_2 k - 1$ such layers with $k/2$ nodes in each layer. The notation L(v) denotes the number of the layer in which v lies. The $B_i(k)$ as well as C(k) are symmetric about the middle layer of the Beneš networks, that is about the $\log_2 k - 1$ layer. This middle layer has a total of $(k/2) \log_2 k$ nodes. It is well-known that C(k) is strictly nonblocking. See, for example, G. M. Masson et al., "A Sampler of Circuit Switching Networks," IEEE Computer, 5:32-48 (June 1979).

Figure 4:
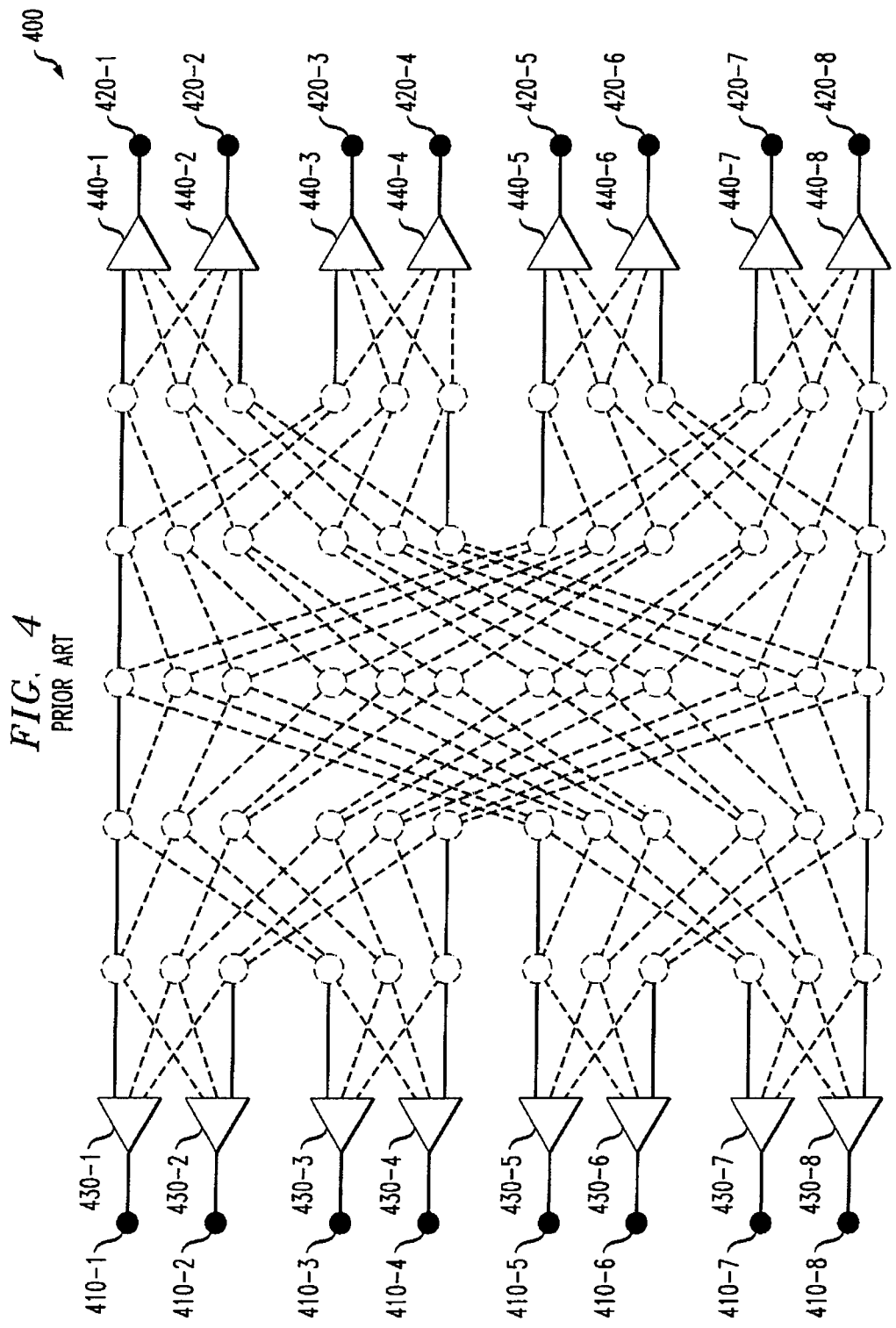
FIG. 4 illustrates an alternative exemplary 8×8 Cantor network.

FIG. 4 illustrates an alternative 8×8 Cantor network 400. FIG. 4 shows more clearly the expansion aspects of the design that is used in the analysis. As shown in FIG. 4, solid nodes on the left denote input nodes 410-1 through 410-8, solid nodes on the right denote output nodes 420-1 through 420-8. The open circles are 2×2 switches, referred to as switch nodes. The triangles are 1×3 switches 430-1 through 430-8 and 440-1 through 440-8. The numbers 0, 1, 2 in FIG. 4 indicate the level numbers up to the middle level (level 2). To show that C(k) is strictly nonblocking, suppose S is a valid set of demands, R is a valid routing of S and $S \cup \{d\}$ is also a valid set of demands. Then, it is desired to show that there is a routing of the demand $d=(i,j)$ that uses no edges of the routes already used by R. The notation A(m) is used to mean the lower bound on the number of nodes at the $m^{th}$ layer to which there is a path from input node i that does not use any edges used by R. It is easy to see that $A(0)=\log_2 k$ and inductively:

$$A(m) = 2A(m-1) - 2^{m-1} \quad (1)$$

$$= 2^m A(0) - m 2^{m-1}. \quad (2)$$

This can be seen by noticing in FIG. 4 that the number of nodes that can be reached at level m from input node i is twice the number that can be reached at level m−1 (since the outdegree of each node is two and the edges from the nodes in A(m) all go to distinct nodes at level m+1). Also, $2^{m-1}$ of the nodes that are reachable from input node i at level m+1 if no other demands are routed might in fact be blocked by demands that have been routed. Then, at the middle layer $$A(\log_2 k - 1) = \frac{k \log_2 k}{2} - \frac{(\log_2 k - 1)k}{4} \quad (3)$$

$$= \frac{k(\log_2 k + 1)}{4}. \quad (4)$$

It can also be shown that there are at least the same number of nodes at the middle layer from which there is a path to output node j. Thus, the total of both of these lower bounds is $$\frac{k(\log_2 k + 1)}{2}$$

and this is greater than the total number $$\frac{k(\log_2 k)}{2}$$

of nodes in the middle layer (level 2). This implies that there must be at least one node n in the middle layer for which there is a path from i to n and a path from n to j such that no edge of either path is used by any path in R. That is, there is a valid path for the demand $d=(i,j)$.

It should be noted that the above argument actually shows the following somewhat stronger result. Let A be a subset of the input nodes and for $a \in A$ let $p_a$ be a path from input node a to some node b at some level $m_a$ where $m_a \le \log_2 k - 1$. Suppose $i,j \notin A$. Then, there are paths $p_i$ and $p_j$ starting at i and j respectively, and both ending at the same node at level $\log_2 k - 1$ so that neither $p_i$ nor $p_j$ shares any edge with any path $p_a$ where $a \in A$. (Note that $p_i$ and $p_j$ might have edges in common.) This can be used to show that a modified version of the Cantor network in accordance with the present invention is widesense nonblocking.

Undirected Cantor Network

The present invention considers widesense nonblocking cross connects rather than strictly nonblocking cross connects. Consider the Cantor network 300, 400 of FIGS. 3 and 4. In the directed case, there is a unique directed path from any input node to any given node in the middle layer and similarly from any middle layer node to any given output node. Thus, the only real choice is which middle layer node a demand should be routed through. Once that middle layer node has been chosen, the path is unique. However, in the undirected case, there are paths from an input node to a middle layer node that could move back and forth and use up most of the edges in the graph. Thus, allowing arbitrary routings tends to be much more difficult in the undirected setting.

Figure 5:
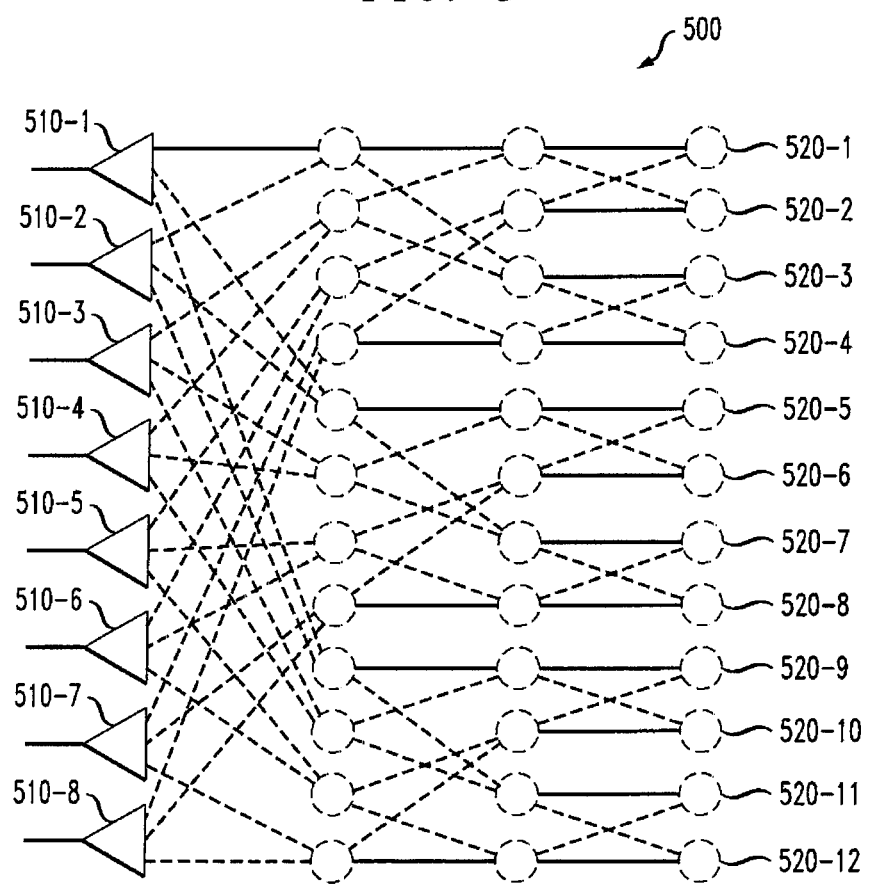
FIG. 5 illustrates an exemplary 8×8 undirected Cantor network in accordance with an embodiment of the present invention.

FIG. 5 illustrates an exemplary 8×8 undirected Cantor network 500 in accordance with an embodiment of the present invention, where the number of leaf nodes 510-1 through 510-8 is k=8. The open circles are 2×2 switches, referred to as switch nodes. The triangles are 1×3 switches. In general, the construction is just the half of a directed version of a Cantor network 400 from the input nodes 510 to the middle layer nodes 520-1 through 520-12 (level 2). The middle layer nodes 520 are marked with dashed circles in FIG. 5. The input or output nodes of the Cantor network 500 and those of the constituent Beneš networks are not shown. The undirected Cantor network 500 is widesense nonblocking for symmetric demands.

Figure 6:
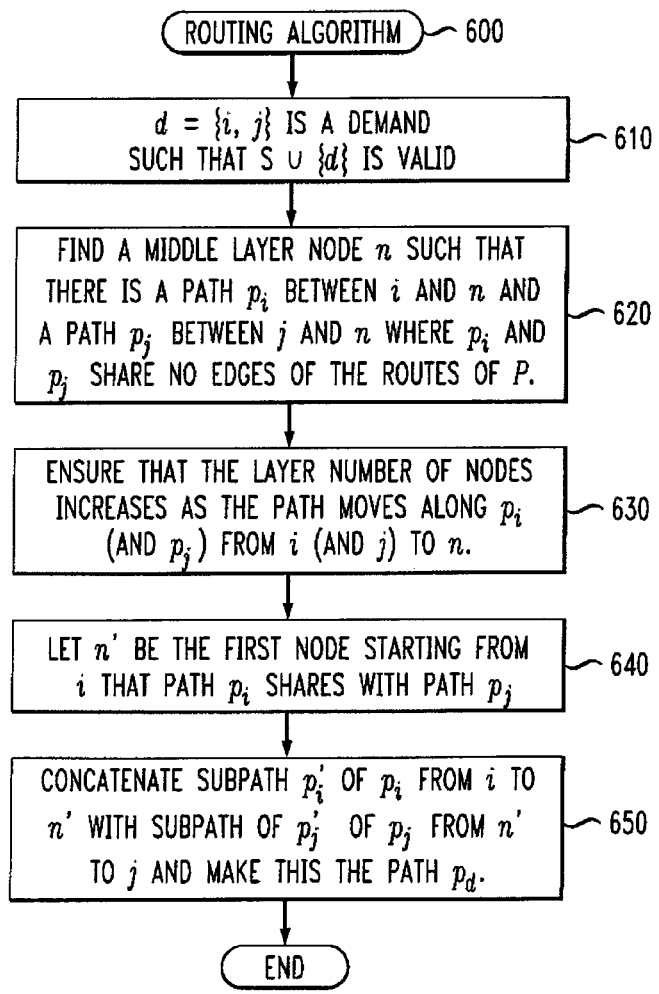
FIG. 6 is a flow chart describing an exemplary implementation of a routing algorithm, Alg, incorporating features of the present invention.

FIG. 6 is a flow chart describing an exemplary implementation of a routing algorithm 600, Alg, incorporating features of the present invention. Suppose S is a valid set of demands where P is a valid routing of S as computed by Alg. Let d={i,j} be a demand such that S∪{d} is valid (step 610). Find a middle layer node n during step 620 such that there is a path $p_i$ between i and n and a path $p_j$ between j and n where $p_i$ and $p_j$ share no edges of the routes of P. Also, Alg is restricted during step 630 so that the layer number of nodes increases as the path moves along $p_i$ (and $p_j$) from i (and j) to n. During step 640, n' is the first node starting from i that path $p_i$ shares with path $p_j$. Then, during step 650, the subpath $p'_i$ of $p_i$ from i to n' is concatenated with the subpath of $p'_j$ of $p_j$ from n' to j. This path is $p_d$. It can be shown that an undirected Cantor network is widesense nonblocking using algorithm Alg.

The route chosen for the demand {i,j} by Alg consists of edge disjoint paths from i and j to some common node along $p_i$ and $p_j$. This common node might be n or it might be some node at some lower level. Thus, C(k) is widesense nonblocking.

Figure 7:
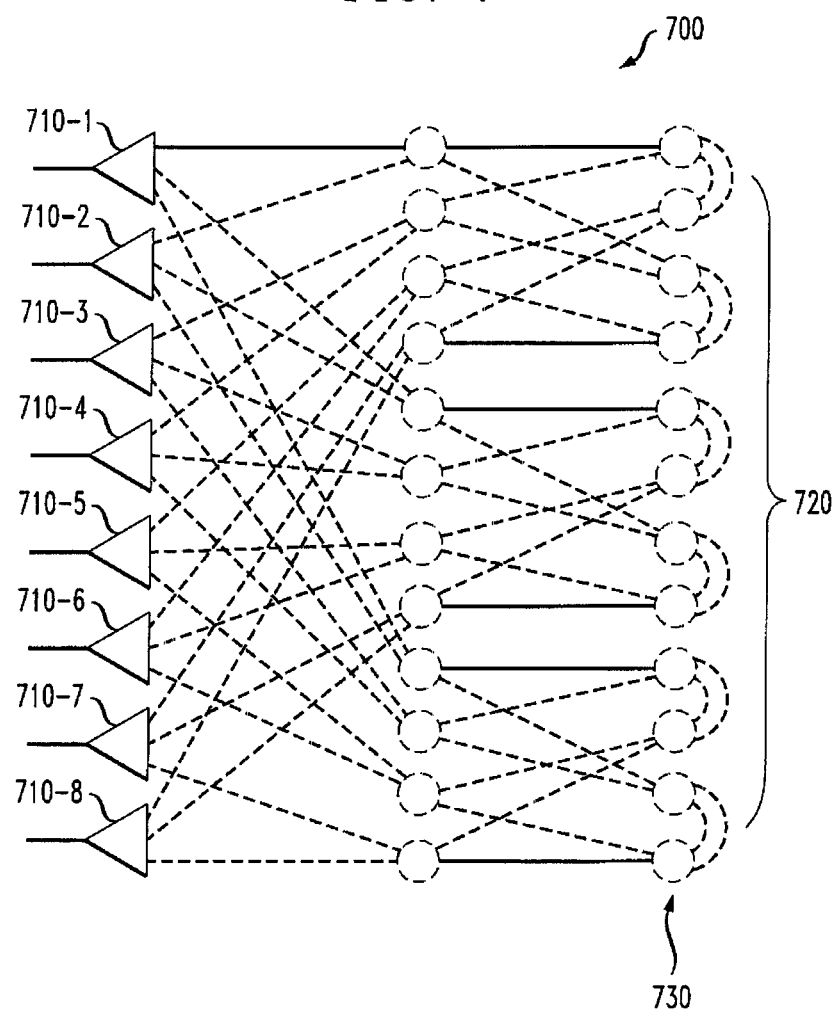
FIGS. 7 and 8 illustrate simplified versions of the exemplary 8×8 undirected Cantor network of FIG. 5.
Figure 8:
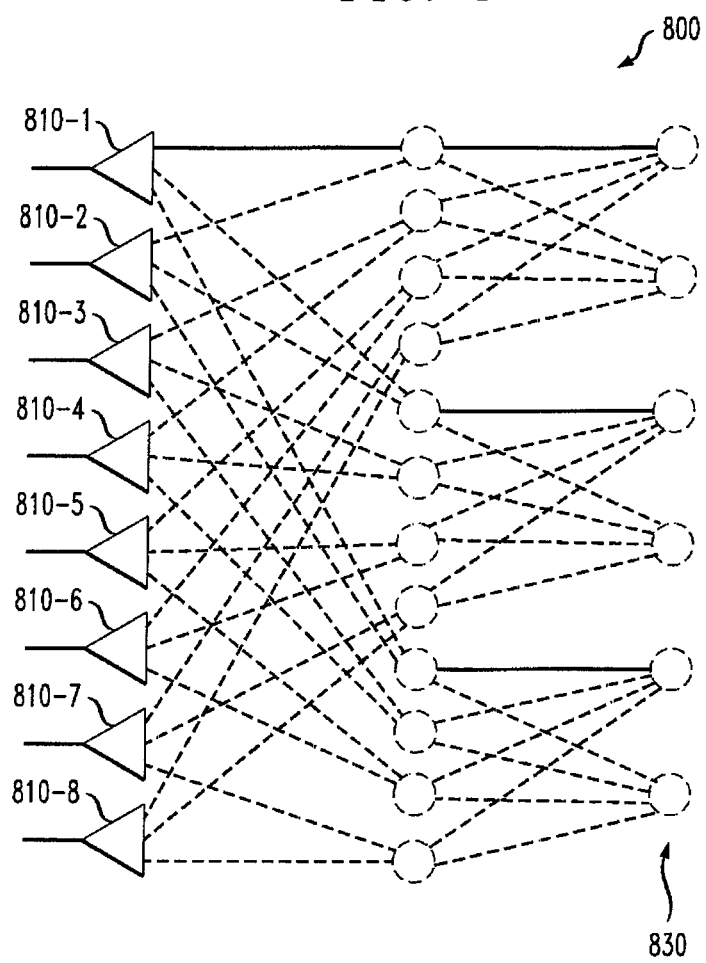

FIGS. 7 and 8 illustrate simplified versions 700, 800 of the 8×8 undirected Cantor network 500 of FIG. 5. The open circles are 2×2 switches, referred to as switch nodes. The triangles are 1×3 switches. It should be noted that the middle level nodes of FIG. 5 are not really necessary since they are degree two. That is, the middle level nodes can be replaced with simple connections 720, as shown in FIG. 7. Then, the 12 nodes at the final layer 730 in FIG. 7 that are connected by two parallel links can be merged as pairs into six degree-4 nodes 830, as shown in FIG. 8.

The complexity of the undirected Cantor network 500, 700, 800 can be viewed as follows. Each initial triangle node is a 1×$\log_2$ k switch which can be constructed from a single 1+$\log_2$ k WSS as mentioned above. The design of degree-4 nodes can be used in each of the nodes in the final stage of the undirected Cantor network. The other nodes in the design can each be realized using a single hybrid-4 node as described above. There are k $\log_2$ k such nodes in each of $\log_2$ k−2 levels and k $\log_2$ k/2 at the final level. Thus, the total complexity of the disclosed undirected Cantor networks is roughly k $\log_2^2$ k.

Clos Cross Connect

Consider a design based on a traditional directed strictly nonblocking Clos cross connect.

Directed Clos Cross Connect

Figure 9:
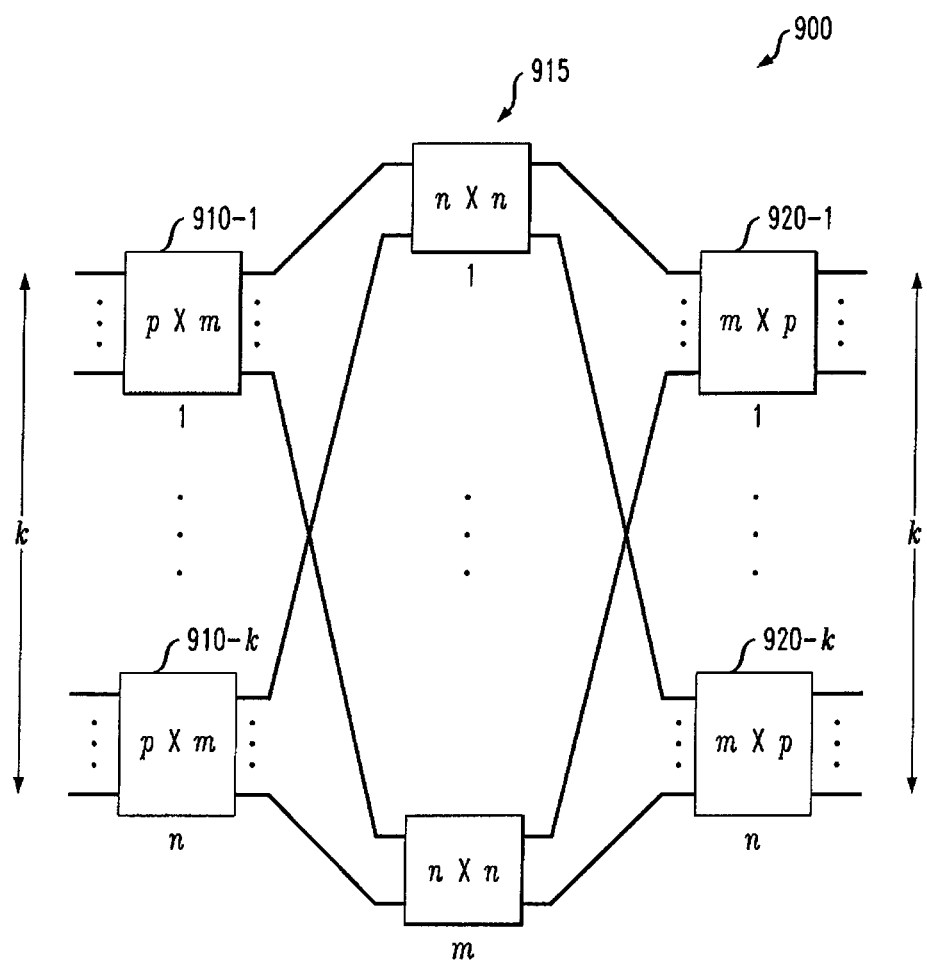
FIG. 9 illustrates a conventional Clos cross connect design having k input ports and k output ports.

FIG. 9 illustrates a conventional (3-stage) Clos cross connect design 900 for k input ports 910-1 through 910-k and k output ports 920-1 through 920-k. Again, the actual graph is considered to be a directed graph with edges directed from left to right. It is well-known that if m, the number of center stage switches 915 is at least 2p−1, then the directed Clos cross connect is strictly nonblocking.

Undirected Clos Cross Connect

Figure 10:
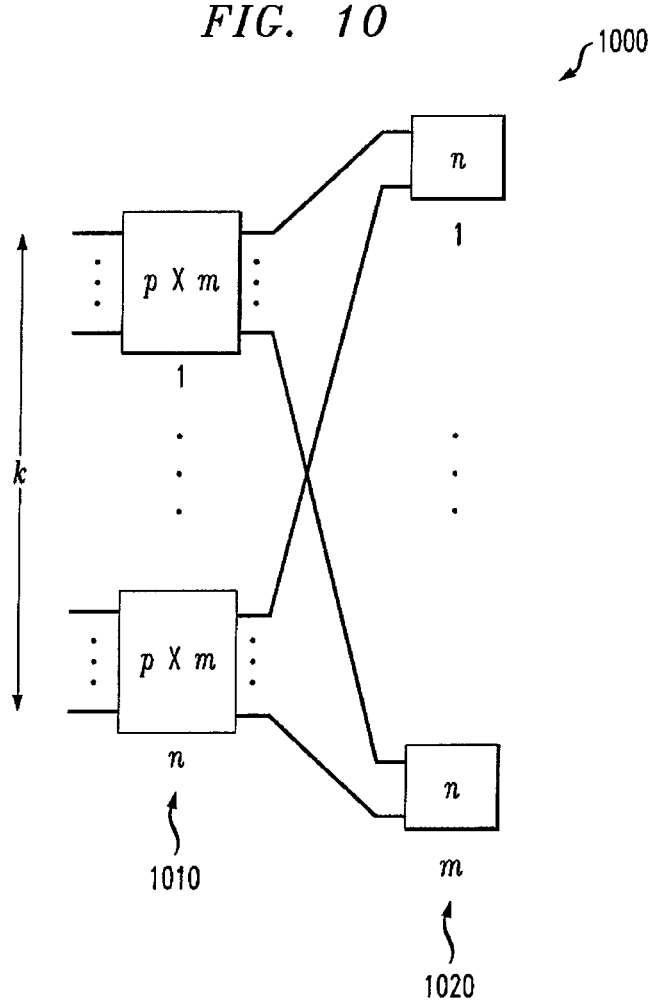
FIG. 10 illustrates an undirected Clos Cross network with k ports, in accordance with the present invention.

As with the Cantor network, the present invention recognizes that a widesense nonblocking undirected cross connect can be constructed with k ports based on the Clos design. FIG. 10 illustrates an undirected Clos Cross network 1000 with k ports, in accordance with the present invention. This general design has been investigated in early work that was interested in determining the minimum number of second stage switches for a rearrangeably nonblocking design. See, for example, W. Kabacinski, "Comment: Two-stage Non-Blocking Bidirectional Switch Networks," Electronics Letters, 25(17):1198 (August 1989) and P. Raby and P. Banks, "Two-Stage Nonblocking Bidirectional Switch Networks," Electronics Letters, 24(6):362-363, March 1988. However, they only allowed demands between ports on different first stage switches whereas the present invention allows such demands plus demands where both ports are on the same first stage switch.

The k ports are connected to n first stage p×m switches 1010. The second stage undirected switches 1020 with n ports can be implemented using, for example, the undirected Cantor network 500, 700, 800 described above. Thus, it is assumed that the second stage switches 1020 are all widesense nonblocking.

The first stage switches 1010 are hybrid cross connects. That is, if A is the set of p ports on the left side and B is the set of m ports on the right side, then any set of demands must be supported where demands have either both end ports in A or one in A and one in B. Given that the second stage switches 1020 are widesense nonblocking, then if the hybrid cross connects at the first stage 1010 are strictly or widesense nonblocking and m≥2p−1 then the resulting undirected Clos cross connect will be widesense nonblocking.

Figure 11:
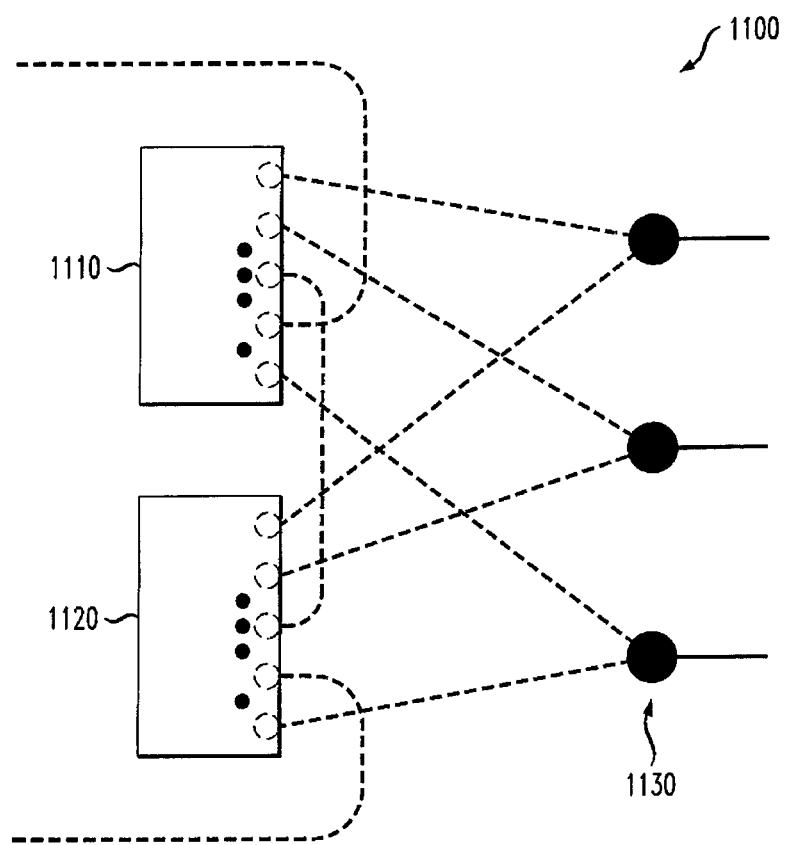
FIG. 11 illustrates an exemplary implementation of a 2×3 Clos cross connect switch.

If p=2 and m=3, then a first stage switch 1010 can be built, as indicated in FIG. 11. FIG. 11 illustrates an exemplary implementation of a 2×3 switch 1100. As shown in FIG. 11, the black circles 1130 indicate optical couplers (i.e., power combiner/splitters) and the rectangles 1110, 1120 represent 5-port WSSs using the notation described above. Thus, the total complexity of the k/2 first stage switches 1110, 1120 would be k/2. If undirected k/2×k/2 Cantor cross connects were used for the three second stage switches 1130, each with roughly k $\log_2^2$ k/2 complexity, then the total complexity would be on the order of 3k $\log_2^2$/2.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. An undirected Cantor network, comprising:
   k bidirectional ports;
   at least one layer of bidirectional wavelength selective switch nodes configured for performing bidirectional communication of light, wherein at least a given one of said bidirectional wavelength selective switch nodes is configured for receiving a received light signal from a bidirectional wavelength selective switch node in a first layer of said undirected Cantor network, wherein said first layer is a different layer than a layer of said given one of said bidirectional wavelength selective switch nodes, and forwarding said received light signal to a bidirectional wavelength selective switch node in said first layer; and
   k bidirectional switches for connecting said k bidirectional ports to said at least one layer of bidirectional switch nodes.

2. The undirected Cantor network of claim 1, wherein said k bidirectional switches are 1×3 switches.

3. The undirected Cantor network of claim 1, wherein said undirected Cantor network comprises half of a directed version of a Cantor network.

4. The undirected Cantor network of claim 1, wherein one or more nodes in a middle layer are replaced by one or more connections.

5. The undirected Cantor network of claim 4, wherein one or more nodes in a final layer that are connected by two parallel links are merged as pairs into degree-4 nodes.

6. The undirected Cantor network of claim 1, wherein said wavelength selective switches comprise node port connection means for providing reciprocal connectivity between each of N node ports and terminals of a wavelength selective switch, so that each switch state activated by a control signal provides a set of at least one unique node port-pair connections.

7. The undirected Cantor network of claim 1, wherein said undirected Cantor network is widesense non-blocking.

8. An undirected Clos cross connect, comprising:
   k bidirectional ports;
   n first stage p×m bidirectional switches connected to said k bidirectional ports, wherein said first stage bidirectional switches are configured for performing bidirectional communication of light; and
   a plurality of second stage bidirectional switches, wherein one or more of said bidirectional switches are undirected Cantor networks having at least one bidirectional switch node that is a wavelength selective switch, wherein at least one of said bidirectional wavelength selective switch nodes is configured for receiving a received light signal from a bidirectional wavelength selective switch node in a first layer of said undirected Cantor network, wherein said first layer is a different layer than a layer of said given one of said bidirectional wavelength selective switch nodes, and forwarding said received light signal to a bidirectional wavelength selective switch node in said first layer.

9. The undirected Clos cross connect of claim 8, wherein said first stage bidirectional switches are hybrid cross connects.

10. The undirected Clos cross connect of claim 8, wherein said wavelength selective switch comprises node port connection means for providing reciprocal connectivity between each of N node ports and terminals of said wavelength selective switch, so that each switch state activated by a control signal provides a set of at least one unique node port-pair connections.

11. The undirected Clos cross connect of claim 8, wherein said undirected Clos cross connect is widesense non-blocking.

* * * * *